May 31, 1927.

H. ROSENTHAL 1,630,408

GAS PRESSURE REGULATOR

Filed Nov. 12, 1925

Inventor:
H. Rosenthal

By: Marks & Clerk
Attys

Patented May 31, 1927.

1,630,408

UNITED STATES PATENT OFFICE.

HANS ROSENTHAL, OF BERLIN, GERMANY.

GAS-PRESSURE REGULATOR.

Application filed November 12, 1925, Serial No. 68,722, and in Germany November 18, 1924.

This invention relates to gas-pressure regulators acting with a membrane or diaphragm, and the object thereof is to provide an improved construction, which will allow the same to be readily taken apart and cleaned.

It is old in the case of pressure regulators of the type in question to provide the casing thereof with a thread for the purpose of allowing the same to be easily removed, and furthermore to also furnish the valve member itself with a thread allowing the same to be readily disconnected from the pressure container, that is, the connecting pipe thereof. Although in this manner the possibility is provided of cleaning the valve seating without taking the whole regulator entirely apart, the complete regulating mechanism, that is, the lever rod mechanism and the regulating spring together with the adjustment means, is nevertheless situated within the casing, and access to the same may only be obtained by removing the cover of the casing and the membrane.

The present invention comprises a pressure regulator, in which the so-called high pressure portion may be screwed into the regulator casing as a unit, and readily connected with the membrane. With this object in view it is desirable to make the valve rod, as much as possible co-axial with the thread of the high pressure portion, and to more or less taper off the free end of the said valve rod, in order that the same will engage without difficulty with the reception boring provided therefor in the stud of the diaphragm; and on the other hand to make the portion of the diaphragm stud, in which the boring is situated, annular, i. e., of enlarged form, and furnish the boring with a conical enlargement in the direction towards the valve.

Since as regards both the transmission mechanism as well as the membrane, movement is merely required in the one direction, it is necessary upon screwing in the high pressure portion to take care that when mounting the transmission mechanism is movable in the same direction as the membrane.

In order to nevertheless obtain an absolutely dense and firm connection between the high pressure portion and the regulator casing the threaded abutment or socket member of the valve casing is preferably made somewhat conical.

The invention is illustrated by way of example in the accompanying drawing, in which—

Figure 1:
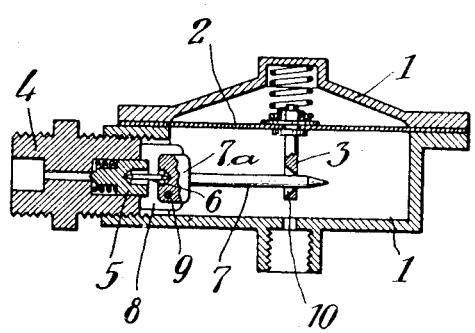
Figure 2:
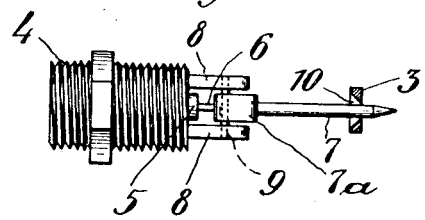

Fig. 1 shows the regulator in section viewed from the side,

Fig. 2 being a view of the high pressure portion or valve member viewed from above.

With reference to the drawing, 1 is the regulator casing, having a membrane 2 acted upon by a spring, 3 being the membrane stud. 4 is the socket, provided with a thread and preferably somewhat conical in form, and screwed into the casing 1. The socket member 4 constitutes a unit with the valve proper 5, the intermediate member 6, and the valve lever 7. The enlarged end 7ª of the valve rod 7 oscillates in the fork-member 8 about a pin 9, the free and tapered end of the rod 7 being capable of engagement with a preferably conical boring 10 provided in the stud 3. The stud at this point is preferably broadened out, forming a loop.

It will readily be seen that with this construction the parts 4—9 may easily be removed from the casing 1 for the purpose of cleaning, and again inserted without difficulty, without having to remove the membrane each time with the consequent necessity for readjustment.

What I claim is:

1. A gas pressure regulator of the character described, including a casing having inlet and outlet openings, a pressure responsive device situated within the casing, a socket member insertable in the inlet opening of the casing in the direction of flow, a valve mounted on the socket member, a valve rod, an enlarged end on said valve rod, a forked-shaped extension projecting from the socket member, a pin for mounting the enlarged end of the valve rod for oscillatory movement between the forked-shaped extension, the valve and valve rod being mounted on the socket member so as to be removable therewith, and a stud secured to the membrane and engaging said valve rod.

2. A gas pressure regulator of the character described, including a casing having inlet and outlet openings, a pressure responsive device situated within the casing, a conical socket member insertable in the inlet opening of the casing when the other parts are assembled, a valve mounted on the socket member, a valve rod, an enlarged end on said valve rod, a forked-shaped extension integral with and projecting from the socket member, a pin for mounting the enlarged end of the valve rod for oscillatory movement between the forked-shaped extension, the socket member and the parts carried thereby being constructed as a unit, and a stud secured to the membrane and engaging said valve rod, substantially as and for the purposes set forth.

In testimony whereof I have affixed my signature.

Dr. HANS ROSENTHAL.